Patented Aug. 9, 1938

2,126,048

UNITED STATES PATENT OFFICE 2,126,048

INTERMEDIATES FOR AZO DYES

Wilfred Archibald Sexton, Manchester, England, assignor to Imperial Chemical Industries Limited, a corporation of Great Britain No Drawing. Original application January 11, 1935, Serial No. 1,385. Patent No. 2,088,726, dated August 3, 1937. Divided and this application September 25, 1935, Serial No. 42,055. In Great Britain January 16, 1934

7 Claims. (Cl. 260—124)

This invention relates to new intermediates for azo dyes, to new compositions of matter, and to processes by which the intermediates, and the new compositions of matter may be made. The present invention relates to the manufacture of new coupling components for insoluble azo colors.

An object of the invention is to produce new intermediates which, when combined with typical azo components (the diazotized primary arylamines), produce dyestuffs having superior qualities.

The objects of the invention are accomplished, generally speaking, by the manufacture and use of p-aroylamino-arylamides of 2,3-hydroxynaphthoic-acids which are new compositions of matter and are new intermediates and which, when combined in the usual way with a diazotized arylamine, form dyestuffs having superior qualities.

I have found that p-aroylaminoarylamides of 2,3-hydroxynaphthoic acids, which are new chemical compounds that show excellent affinity for cotton which is particularly evidenced in that a high proportion of the compound is taken up by the fiber. I have found, in fact, that they show better affinity than any other 2,3-hydroxynaphthoic arylamides on the market.

These new products may be coupled with the usual diazotized amines on the fiber in known manner, both components being free from solubilizing groups other than the hydroxyl group already mentioned, to give colors which have good fastness to chlorine and also good fastness to light, being in this latter respect rarely below 4 to 5 on the 1 to 8 scale and sometimes as high as 6 or 7. (See Verfahren Normen und Typen für die Prüfung der Echtheitseigenschaften von Färbungen auf Baumwolle, Wolle, Seide, Viscosekunsteide und Azetätzeide. Herausgegeben von der "Echtheitskommission" der Fachgruppe für Chemie der Farben- und Textilindustrie im Verein Deutscher Chemiker. Vierte Ausgabe, 1928. Verlag Chemie, G. m. b. H., Berlin. W. 10).

The high affinity of the new products permits less waste of material in the dyeing and printing process and gives dyeings and prints which are free from loosely-adhering coloring matter and are faster to rubbing.

The new products may be manufactured by interacting an aromatic carboxylic halide with a p-aminoarylamide of 2,3-hydroxynaphthoic acid or by interacting a monoaroyl-p-arylenediamine with a halide of a 2,3-hydroxynaphthoic acid. The compounds to be interacted must be free of solubilizing groups (the carboxylic acid and sulfonic acid groups) as already mentioned. The carboxylic halides may be prepared in situ from the carboxylic acids and, say, phosphorus trichloride.

The following examples in which parts are by weight illustrate but do not limit the invention:

Example I

This describes the manufacture of benzoyl-p-aminoanilide - 2,3 - hydroxynaphthoic acid. 21.2 parts of N-benzoyl-p-phenylenediamine, which is described by Hubner (Annalen, 1881, 208, 295), together with 19.7 parts of 2,3-hydroxynaphthoic acid are agitated with 200 parts of toluene at 60° C. 5.5 parts of phosphorus trichloride are added and the whole boiled gently under reflux until evolution of hydrogen chloride ceases. On cooling, the product is filtered off and freed from traces of acid by washing with water containing sodium carbonate. It has a melting point of 281° C.

Example II

This describes another way of manufacturing the product of Example I. 13.9 parts of 2,3-hydroxynaphthoic-p-aminoanilide (M. P. 221°) together with 6.5 parts of benzoyl chloride are added to 120 parts of toluene and the whole boiled gently under reflux until evolution of hydrogen chloride ceases. On cooling, the insoluble product is filtered off, washed with a little benzene and dried. It has a melting point of 281° C. and is identical with the product made by the first method.

Example III 2 parts of the compound obtained in Example II are pasted with 9 parts of Turkey red oil and 4 parts of caustic soda (62° Tw.) and the paste dissolved by addition of 40 parts of boiling water. The solution is then bulked to 1000 parts with water, when it is clear yellowish orange in color.

Cotton is steeped in the above solution for half an hour at 25–30°, the ratio of liquor to cotton being 20:1 by weight. The exhaustion is 50% while the exhaustion of 2,3-hydroxynaphthoic-β-naphthylamide (the most highly substantive of the commercial arylamides of 2,3 - hydroxynaphthoic acid is only 39%).

Example IV 2,3-hydroxynaphthoic-2'-chloro - 4' - benzoylaminoanilide is prepared by the methods exemplified above. It has M. P. 280°–281° C. When applied to cotton at a 20:1 ratio of liquor to cotton as in Example III, the exhaustion is 60%.

Example V 2,3-hydroxynaphthoic-2'-methyl-5'-chloro-4'-benzoyl-amino-anilide prepared as indicated above has M. P. 268° C. When applied to cotton at a 20:1 liquor-cotton ratio as in Example III, the exhaustion is 40%.

Example VI 2,3 - hydroxynaphthoic - 2'-methyl-4'-benzoyl-aminoanilide prepared as illustrated above has M. P. 254° C. When applied to cotton at a 20:1 ratio of liquor-cotton as in Example III, the exhaustion is 45%.

Example VII 2,3-hydroxynaphthoic-2'-methyl- 4'-(p - anisoylamino) anilide prepared as indicated above has M. P. 230° C. When applied to cotton at 20:1 ratio of liquor-cotton as in Example III, the exhaustion is 50%.

Among the advantages of the invention are the manufacture and use of new compositions of matter, of new intermediates for azo dyestuffs superior to prior art intermediates, in that they have higher affinity for those substances which are dyed by direct cotton dyes, and which produce dyes that exhaust uniformly and more completely than prior art dyestuffs.

As many apparently widely different embodiments of this invention may be made without departing from the spirit and scope thereof, it is to be understood that I do not limit myself to the specific embodiments thereof except as defined in the appended claims.

This application is a division of my earlier application identified as Serial No. 1385, filed January 11, 1935, now Patent No. 2,088,726, issued August 3, 1937.

I claim:

1. Benzoyl-p-aminoanilide of 2:3-hydroxynaphthoic-acid.
2. 2,3-hydroxynaphthoic-2'-methyl-4'-benzoyl-aminoanilide.
3. 2,3-hydroxynaphthoic-2'-methyl-4'-(p-anisoylamino)-anilide.
4. The method of making benzoyl-p-amino-anilide-2,3-hydroxynaphthoic acid which comprises agitating 21.2 parts of N-benzoyl-p-phenylenediamine with 19.7 parts 2,3-hydroxynaphthoic acid in 20.0 parts toluene at 60° C., adding 5.5 parts of phosphorus trichloride and boiling under reflux until the evolution of hydrogen chloride ceases, cooling, filtering, and washing with water containing sodium carbonate.
5. The method of making benzoyl-p-amino-anilide-2,3-hydroxynaphthoic acid which comprises agitating N-benzoyl-p-phenylenediamine with hydroxynaphthoic acid in toluene at elevated temperature, adding phosphorus trichloride and refluxing until the evolution of hydrogen chloride ceases, separating out the solid product and washing it with water containing sodium carbonate.
6. The method of making benzoyl-p-amino-anilide-2,3-hydroxynaphthoic acid which comprises heating N-benzoyl-p-phenylenediamine with hydroxynaphthoic acid and phosphorus trichloride in the presence of toluene and separating the product from the bath.
7. The compounds represented by the formula

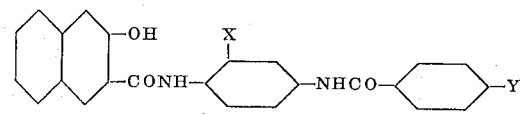

in which X represents one of the group consisting of hydrogen and methyl, and Y represents one of the group consisting of hydrogen and methoxy.

WILFRED ARCHIBALD SEXTON.